United States Patent
Kwon

(10) Patent No.: US 8,457,211 B2
(45) Date of Patent: Jun. 4, 2013

(54) SYSTEM AND METHOD FOR IMAGE CODING

(75) Inventor: Do-Kyoung Kwon, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 1080 days.

(21) Appl. No.: 12/274,860

(22) Filed: Nov. 20, 2008

(65) Prior Publication Data

US 2010/0124285 A1 May 20, 2010

(51) Int. Cl.
*H04B 1/66* (2006.01)

(52) U.S. Cl.
USPC .................................................. 375/240.24

(58) Field of Classification Search
USPC .......... 375/240.03, 240.24; 341/107; 382/239
See application file for complete search history.

(56) References Cited

U.S. PATENT DOCUMENTS

| 5,708,511 A * | 1/1998 | Gandhi et al. ................ 382/239 |
| 7,688,234 B2 * | 3/2010 | Koo .............................. 341/107 |
| 2005/0175092 A1 * | 8/2005 | Puri et al. ................. 375/240.03 |
| 2007/0147498 A1 * | 6/2007 | Tanaka et al. ............ 375/240.03 |

* cited by examiner

*Primary Examiner* — Mark Rinehart
*Assistant Examiner* — Gbemileke Onamuti
(74) *Attorney, Agent, or Firm* — Mirna Abyad; W. James Brady; Frederick J. Telecky, Jr.

(57) ABSTRACT

A system and method for image coding with error feedback are provided, including a method comprising receiving image data containing at least one macro block of pixels, and computing an activity indicator for a macro block. The method further comprising computing prediction error values for pixels in the macro block, and scaling the prediction error values based on the activity indicator.

16 Claims, 4 Drawing Sheets

SYSTEM AND METHOD FOR IMAGE CODING

TECHNICAL FIELD

The present invention relates generally to a system and method for image encoding, and more particularly to a system and method for image coding with error feedback.

BACKGROUND

H.264/Advanced Video Coding (AVC) is a video coding standard of the ITU-T Video Coding Experts Group and the ISO/IEC Moving Picture Experts Group. A goal of H.264/AVC is to enhance video compression performance. Comparing H.264/AVC to many existing video coding standards, a significant improvement in rate-distortion efficiency may be seen.

Generally, the coding of video in H.264/AVC involves the partitioning of an image into a number of 16×16 macro blocks (MB) with potentially different block partitions. A typical MB may be partitioned into a single 16×16 block, four 8×8 blocks, 16 4×4 blocks, and so forth. For an image, MB block sizes may be selected depending on the nature of the image. For example, in portions of the image with a lot of detail, smaller blocks may be selected, while for portions of the image with little detail, larger blocks may be selected.

In H.264/AVC, the coding of pixels within an MB may occur in an inter prediction mode or an intra prediction mode. In general, inter prediction mode uses a prediction model from one or more previously encoded video frames, while intra prediction mode uses previously encoded and reconstructed blocks from an image currently being coded.

The coding of pixels within an MB in the intra prediction mode may make use of an intra prediction value from pixels of neighboring blocks. As specified in the H.264/AVC video coding standard, an intra prediction value may be based on reconstructed pixel values (pixel values that are reconstructed from coded pixel values). The reconstructed pixel values may be subtracted from the block prior to the block being coded.

Unfortunately, the use of the reconstructed pixel values, which may help to achieve the significant improvement in rate-distortion efficiency, may require a large amount of computational power, since the encoder is required to dynamically recreate the reconstructed pixel values. Even if the computational power is available, the use of large amounts of computational power may increase the power consumption, which may shorten battery life, for example.

SUMMARY OF THE INVENTION

These and other problems are generally solved or circumvented, and technical advantages are generally achieved, by embodiments of a system and a method for image coding with error feedback.

In accordance with an embodiment, a method for computing intra prediction error feedback values is provided. The method includes receiving image data, the image data containing at least one macro block of pixels, computing an activity indicator for a macro block, computing prediction error values for pixels in the macro block, and scaling the prediction error values based on the activity indicator to produce the intra prediction error feedback values.

In accordance with another embodiment, a method for video coding image data is provided. The method includes receiving the image data, the image data including at least one block of pixels, computing an activity indicator for the block, computing prediction error values for each pixel in the block, adjusting the prediction error values by a factor based on the activity indicator, and video coding the block using the adjusted prediction error values of a neighboring block.

In accordance with another embodiment, an encoder is provided. The encoder includes a macro block unit coupled to an image data input, a prediction error unit coupled to the macro block unit, and a video coding unit coupled to the macro block unit and to the prediction error unit. The macro block unit partitions image data provided by the image data input into a plurality of macro blocks. The prediction error unit computes an activity indicator for a macro block in the plurality of macro blocks, generates prediction error values for pixels in the macro block, and scales the prediction error values based on the activity indicator. The video coding unit encodes image data present in the plurality of macro blocks using the prediction error values.

An advantage of an embodiment is that reconstructed pixel values are not used, which may reduce computational resource requirements. This may relax computational requirements of an electronic device performing video coding. Additionally, reduced computational requirements may reduce cost, power consumption, and so forth.

A further advantage of an embodiment is that a multi-level approach is used in video coding. This may allow for optimization of the video coding performance based on the video being coded.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a H.264/AVC video coder operating in an intra prediction mode. The invention may also be applied, however, to other video coders such as H.264/SVC (H.264/Scalable Video Codec) that make use of neighboring pixel values in the coding of pixels in a pixel block.

Figure 1:
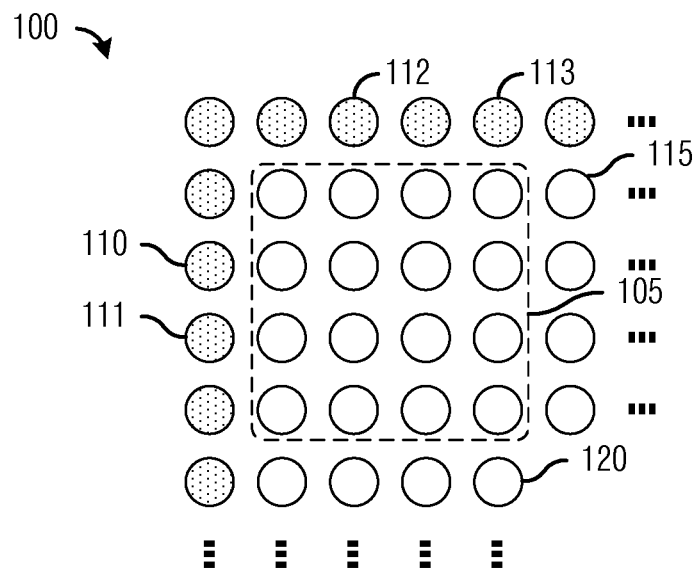
FIG. 1 is a diagram of a portion of an image.

FIG. 1 shows a diagram illustrating a portion of an image 100 to be coded. The image 100 shown in FIG. 1 illustrates a 4×4 block 105 in an MB and a number of neighboring pixels, such as pixel 110, pixel 111, pixel 112, and pixel 113. Neighboring pixels, such as pixel 110, pixel 111, pixel 112, and pixel 113, may be a part of either different MBs or the same MB but different blocks and may already be coded. In addition to neighboring pixels, such as pixel 110, pixel 111, pixel 112, and pixel 113, 4×4 block 105 may also have neighboring pixels on its right side (such as pixel 115) and its bottom side (such as pixel 120). Generally, the coding of the image 100 occurs from left to right and from top to bottom, therefore, neighboring pixels on the right side and bottom side of 4×4 block 105 may not already be coded, so, typically, they will not be used in the coding of pixels in 4×4 pixel block 105.

As discussed previously, the use of an intra prediction value that includes reconstructed pixel values from neighboring blocks in the video coding of pixels in an MB may significantly increase computational requirements of video coding. A prior art technique to help reduce computational requirements of video coding is to make use of an intra prediction value that includes original pixel values from neighboring blocks rather than reconstructed pixel values. The use of original pixel values instead of reconstructed pixel values may significantly reduce computational requirements.

Figure 2:
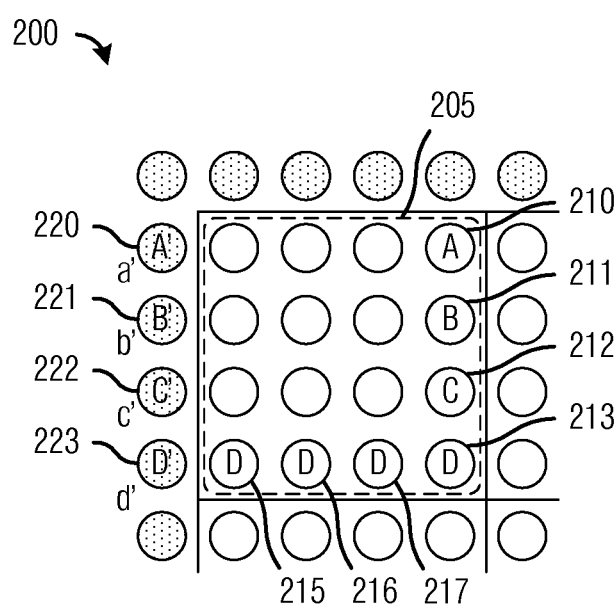
FIG. 2 is a diagram of a portion of an image, including pixel values.

FIG. 2 is a diagram illustrating a portion of an image 200 to be coded. The image 200 includes a 4×4 block 205 in a MB. 4×4 block 205 includes a number of pixels, including pixels 210-213 along a right-hand side of 4×4 block 205 and pixels 215-217 and pixel 213 making up a bottom side of 4×4 block 205. 4×4 block 205 may be adjacent to other pixels. For example, along a left-hand side of 4×4 block 205, there may be pixels 220-223.

Pixels in the image 200 may have original values, and if already coded, reconstructed values. For example, pixel 220 may have original value A' and reconstructed value a'. Similarly, pixels 221-223 may have original values B', C', and D', and reconstructed values b', c', and d', respectively.

Then, according to H.264/AVC, if video coding is operating in Mode 1 (horizontal prediction), then pixel 210 may be coded as CODE(A−a'), where CODE(.) is the video coding operation, and A−a' is the original value of pixel 210 minus a neighboring pixel's reconstructed value (pixel 220). Similarly, pixel 213 may be coded as CODE(D−d'). There are other video coding modes, such as Mode 0 (vertical), Mode 2 (DC), Mode 3 (diagonal down-left), Mode 4 (diagonal down-right), Mode 5 (vertical-right), Mode 6 (horizontal-down), Mode 7 (vertical-left), and Mode 8 (horizontal-up). The other video coding modes may use different neighboring pixel reconstructed values, according to the video coding mode's prediction direction. Furthermore, there are also other coding modes with different block sizes such as 8×8 and 16×16. Hence, the discussion of 4×4 block using video coding Mode 1 should not be construed as being limiting to the scope or the spirit of the embodiments.

Rather than using neighboring pixel reconstructed values, the prior art technique discussed above uses neighboring pixel original values. For example, if H.264/AVC is operating in Mode 1 and the prior art technique, then pixel 210 may be coded as CODE(A−A'), where A−A' is the original value of pixel 210 minus a neighboring pixel's original value (pixel 220). Similarly, pixel 213 may be coded as CODE(D−D').

Let X', x', and E be an original value, a reconstructed value, and an intra prediction error value, respectively, for a neighboring pixel of a block. The values X' and x' are likely to be different, especially at low video coding bit-rates. Since there may be a considerable difference between the values X' and x' at low video coding bit-rates, there may be a noticeable difference between encoded video using the neighboring pixel's original value (X') and the neighboring pixel's reconstructed value (x').

However, if feedback information based on the intra prediction error E is used to adjust the original value X', then the difference between X' and x' may be reduced. That is, rather than using the neighboring pixel's original value (X'), an adjusted original value, such as X'−f(E), is used, where f(.) is a scaling function for the intra prediction error and may depend on factors such as MB activity and quantization parameter. MB activity is a measure of pixel differences in the MB and gives a measure of the smoothness of the pixels in the MB, while quantization parameter may indicate a degree of quantization performed in video coding.

Furthermore, let P be a predicted value of the neighboring pixel. Then, define the prediction error E as X'−P such that x'=P+CODE(X'−P). Then, after quantization, if the MB is smooth, then the quantized prediction error E'=CODE(X'−P)=0 and x'=P. The smoother the MB, the closer E' is to zero. Therefore, x'=P+E'=P if the MB is smooth. P=x' when the MB is smooth means that the reconstructed value x' of the neighboring pixel may be exactly estimated from P. Therefore, the smoother the MB, the more accurate the reconstructed neighboring pixel estimation. That is, the adjustment of E=X'−P may be used as feedback information to estimate x'. Hence, a scaling may be performed on the intra prediction error value to change an emphasis being placed on the intra prediction error value. For example, if the MB is very smooth, extra emphasis may be placed on the intra prediction error value, while if the MB is very rough, little or no emphasis may be placed on the intra prediction error value.

Figure 3A:
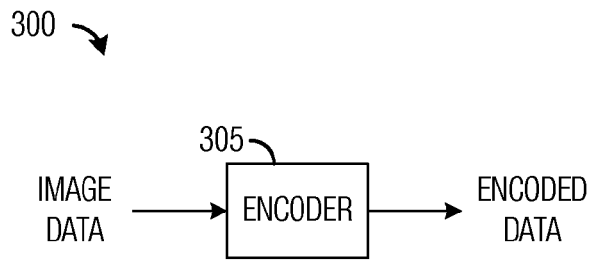
FIG. 3a is a diagram of a video coder.

FIG. 3a is a diagram illustrating a video coder 300. Video coder 300 may be used to convert video (in the form of image data) into encoded data, which may be stored, transmitted, displayed, and so on. An encoder 305 may be used to perform the conversion of the image data into the encoded data. Encoder 305 may utilize a video coding standard, such as H.264/AVC or H.264/SVC, for example, to convert the image data into the encoded data. Depending on implementation, encoder 305 may be capable of supporting more than one video coding standard. The support of multiple video coding standards may help to increase the flexibility of the video coder 300.

Figure 3B:
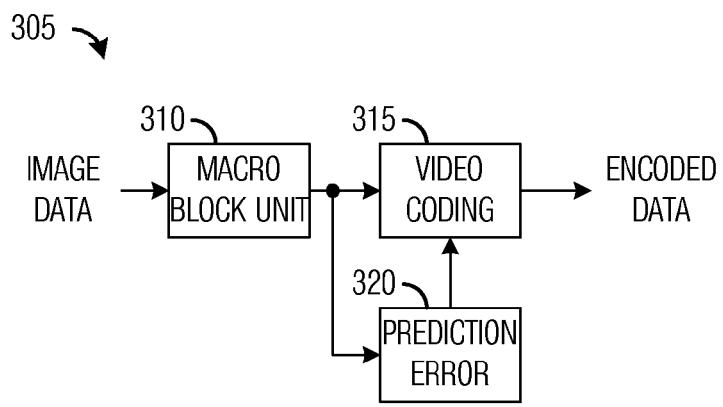
FIG. 3b is a diagram of an encoder.

FIG. 3b is a diagram illustrating a detailed view of encoder 305. Encoder 305 includes a macro block unit 310. Macro block unit 310 may be used to assign MBs to an image as well as partition MBs into blocks. For example, macro block unit 310 may partition MBs into the different sized blocks to different areas of the image based on the nature of the different areas of the image. This may yield better quality images. The MBs may then be provided to a video coding unit 315 and a prediction error unit 320.

Video coding unit 315 may implement the video coding standard to be used to code the image data. For example, video coding unit 315 may implement the H.264/AVC or the H.264/SVC video coding standard. If video coding unit 315 is coding the image data using H.264/AVC video coding standard in intra prediction mode, then video coding unit 315 may use a prediction error provided by prediction error unit 320 in the video coding. The prediction error may be based on original and predicted values of neighboring pixels, while feedback information may be computed from the prediction error.

Furthermore, the prediction error may be based on a measure of activity present in the MB, where a MB's activity value represents a magnitude of a difference between pixel values of pixels in the MB. For example, the activity value for a 16×16 pixel MB may be expressed as:

$$\text{Activity} = \sum_{y=1}^{16} \sum_{x=2}^{16} |MB(y, x) - MB(y, x-1)|,$$

where MB(y,x) is the original value of pixel (y,x) in the 16×16 pixel MB. Other measures of activity may also be used in place of the magnitude of the horizontal pixel difference discussed above, such as the absolute sum of vertical pixel difference, the absolute sum of horizontal and vertical differences, weighted sum of horizontal and/or vertical pixel differences, squares of horizontal and/or vertical pixel differences, transformed coefficient differences, and so forth.

The activity present in the MB may be used to scale the prediction error. For example, if the activity in the MB is low, then the prediction error may be unscaled, while if the activity in the MB is high, then the prediction error may be scaled down. Furthermore, if the activity in the MB is very high, then the use of the prediction error in the video coding may be eliminated all together. A detailed discussion of the use of the activity present in the MB is provided below. The use of the prediction error may help to reduce computational requirements of encoder 305 since neighboring pixel reconstructed values are not used.

Figure 3C:
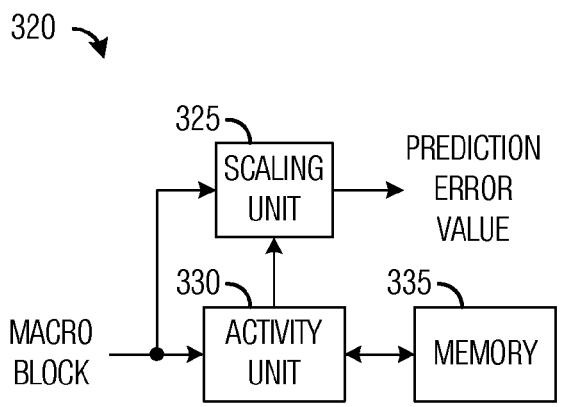
FIG. 3c is a diagram of a prediction error unit.

Prediction error unit 320 may be used to generate intra prediction error values for use in video coding of pixels in blocks of the MB, with the intra prediction error values being adjusted by the MB's activity value and quantization parameter. FIG. 3c is a diagram illustrating a detailed view of prediction error unit 320. Prediction error unit 320 includes a scaling unit 325. Scaling unit 325 may be used to scale an intra prediction error value generated from input MBs based on the MB's activity value provided by an activity unit 330. In addition to providing scaling unit 325 with the MB's activity value, activity unit 330 may also provide quantization parameter. The quantization parameter may be stored in a memory 335. In addition to storing quantization parameter, memory 335 may store other values for use in video coding, such as thresholds for use in multi-level video coding, scaling value, and so forth. For example, scaling value may be stored in the form of a look-up table.

Figure 4:
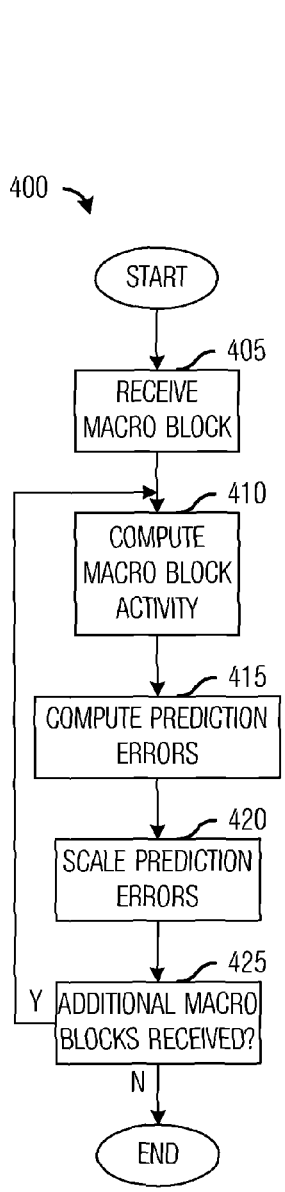
FIG. 4 is a flow diagram of an algorithm for use in computing intra prediction error values.

FIG. 4 is a flow diagram illustrating an algorithm 400 for use in computing intra prediction error values, wherein algorithm 400 makes use of an error feedback. Algorithm 400 may be used while an encoder, such as encoder 300, is in operation video coding image data into encoded data. Algorithm 400 may continue until encoder 300 is powered down, reset, or is otherwise stopped from normal operation.

The computing of intra prediction error values using an error feedback signal 400 may begin with the receiving of a MB (block 405). As discussed previously, according to H.264/AVC, a MB may be partitioned into a 16×16 block, or also into four 8×8 blocks and 16 4×4 blocks. From the MB, an MB activity value may be computed (block 410). Generally, a single MB will have a single MB activity value. As discussed previously, the MB activity value may be a measure of the absolute value of horizontal pixel differences in the MB. Alternatively, the MB activity value may measure the absolute value of vertical pixel differences, the absolute sum of horizontal and vertical pixel differences, weighted sum of horizontal and/or vertical pixel differences, square of horizontal and/or vertical pixel difference, transformed coefficient differences, and so forth.

Then the intra prediction error values may be computed (block 415). The intra prediction error values may be computed from the pixel values of a block of the MB and the estimated reconstructed pixel values of neighboring pixels, a difference between them, for example. Each pixel in the block may have an intra prediction error value. The neighboring pixel used in the computing of the intra prediction error value for a pixel in the block may be dependant on the coding mode used in video coding. For instance, using Mode 1 (horizontal mode), a pixel's neighboring pixel will be a pixel on the right hand edge of a block immediately adjacent to left hand side of the block.

As an example, referring back to FIG. 2, assume that the estimated reconstructed values of pixels 220-223 are the same with their reconstructed pixel values. This is possible as described above using intra prediction error feedback when the MB in which pixels 220-223 are located is very smooth. When Mode 1 is being used, the intra prediction error values for pixels 210-213 are A–a', B–b', C–c', and D–d', respectively, while the intra prediction error values for pixels 215-217 are all D–d'. For a block immediately to the right of block 205, the intra prediction error values for pixels referencing block 205 are A–a', B–b', C–c' and D–d', respectively, while the intra prediction error feedback values for pixels referencing block 205 are f(A–a'), f(B–b'), f(C–c') and f(D–d'), respectively. The estimated reconstructed pixel values of pixels 210-213 are A–f(A–a'), B–f(B–b'), C–f(C–c'), and D–f (D–d'), respectively. For a block immediately below block 205, the intra prediction error values for pixels referencing block 205 are all D–d', while the intra prediction error feedback values for pixels referencing block 205 are all f(D–d'). Then, the estimated reconstructed pixel values of pixels 215-217 are all D–f(D–d').

After the intra prediction error values are computed (block 415), they may be scaled based on the MB activity value (block 420). As discussed previously, the accuracy of the intra prediction error values may change depending on the MB's smoothness (e.g., MB activity value). Therefore, if the MB activity value is small, then the intra prediction error values may be left unscaled, while if the MB activity value is large, then the intra prediction error value may be scaled down. Furthermore, if the MB activity value is very large, then it may be desirable not to utilize the intra prediction error values altogether.

In addition to scaling the intra prediction error values based on the MB activity value, a quantization parameter may also be used in the scaling of the intra prediction error value. Generally, the quantization parameter provides an indication of a degree of quantization used in video coding, with larger quantization parameter value indicating a greater amount of quantization. As an example, in a case with two MBs having about the same MB activity value, the intra prediction error values of an MB with a lower quantization parameter should be scaled down by a greater amount than those of an MB with a larger quantization parameter. While, if two MBs have the same quantization parameter, the intra prediction error values of an MB with a larger MB activity value would be scaled down by a greater amount than those of an MB with a smaller MB activity value.

After scaling, the scaled intra prediction error values (the feedback information) may then be used in video coding. The computing of intra prediction error values using an error feedback signal 400 may continue as long as additional image data continue to be received. If additional image data is not received, then the computing of intra prediction error values using an error feedback signal 400 may terminate.

Figure 5:
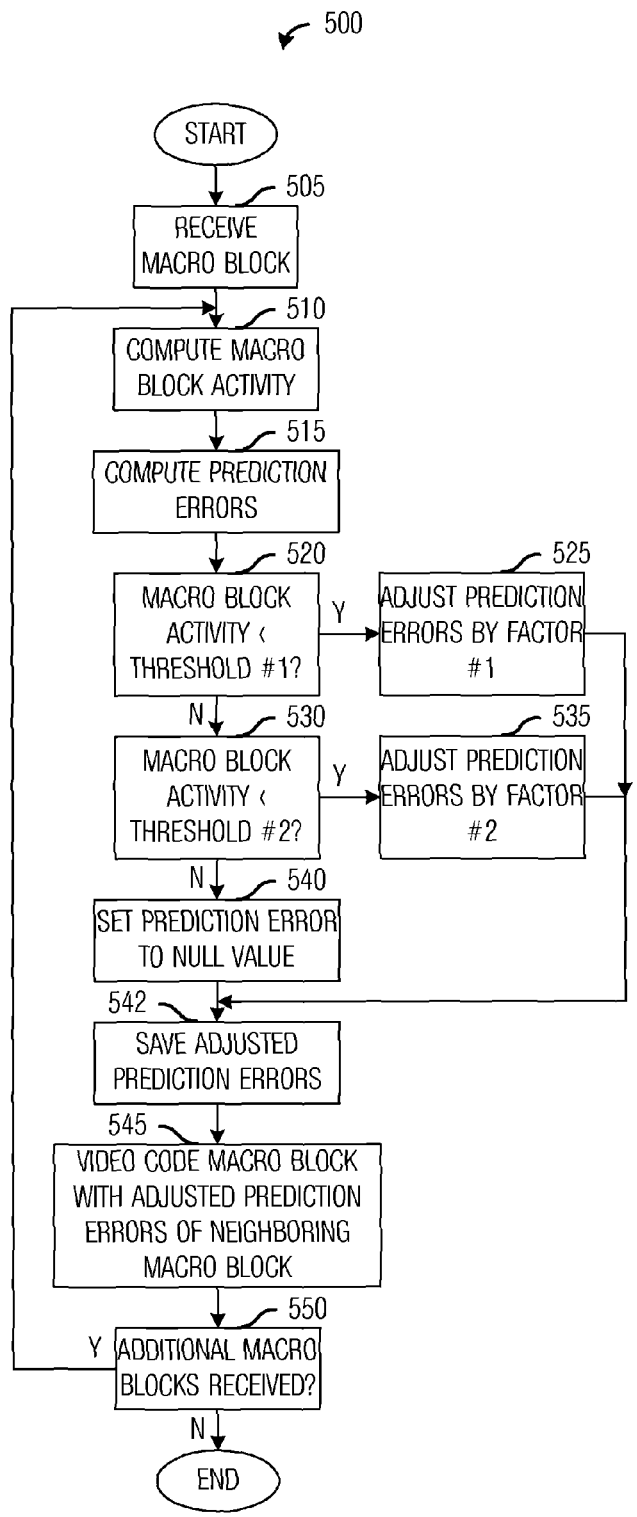
FIG. 5 is a flow diagram of an algorithm for use in video coding image data.

FIG. 5 is a flow diagram illustrating an algorithm 500 for use in video coding image data, wherein algorithm 500 is a multi-level video coding based on the image data. Algorithm 500 may be used while an encoder, such as encoder 300, is in operation video coding image data into encoded data. Algorithm 500 may continue until encoder 300 is powered down, reset, or is otherwise stopped from normal operation.

The video coding of image data may begin with the receiving of an MB (block 505). After the MB has been received, then an MB activity value for the MB may be computed (block 510). The MB activity value may be a measure of smoothness of the MB and is an indicator of pixel value differences in the MB. As discussed previously, the MB activity value may be computed from the absolute value of horizontal pixel differences, the absolute value of vertical pixel differences, square of horizontal and/or vertical pixel difference, and so forth, of pixels in the MB. The MB activity value may be used to select a level of video coding as well as to scale intra prediction error values used in the video coding.

After the MB activity value has been computed (block 510), the video coding of image data 500 may continue by computing the intra prediction error values for the MB (block 515). The intra prediction error values may be computed by computing a difference between an original value and a predicted value of a neighboring pixel, with the neighboring pixel being dependent on an encoding mode being used in the video coding.

After the intra prediction error values and the MB activity value have been computed (blocks 510 and 515), then a video coding level may be selected and the intra prediction error values may be adjusted (e.g., scaled). The video coding of image data 500 is a three-level video coding algorithm that makes use of two thresholds, threshold #1 and threshold #2. The thresholds may be prespecified and stored in a memory, such as memory 335. Although the discussion focuses on a three-level video coding algorithm with two thresholds, greater or fewer levels (with more or less thresholds) may also be used. For example, a two-level video coding algorithm with one threshold or a four-level video coding algorithm with three thresholds may be used. Therefore, the discussion herein should not be construed as being limiting to either the scope or the spirit of the embodiments.

If the MB activity value is less than a first threshold (block 520) then the intra prediction error values may be adjusted (e.g., scaled) by a first factor (block 525). The first threshold may be specified to denote what may be defined as a very smooth MB, so if the MB activity value is less than the first threshold, then the MB is very smooth. If the MB is very smooth, then the use of adjusted intra prediction error values (the feedback information) may provide accurate results, therefore, additional emphasis should be given to the intra prediction error values. This may be achieved by leaving the intra prediction error values unchanged.

The adjustment of the intra prediction error values may also take into consideration a quantization parameter. Generally, if the quantization parameter is small, then the intra prediction error values may be adjusted by an amount that is greater than if the quantization parameter is large. This may be a result of large amounts of quantization introducing a greater amount of error or noise than small amounts of quantization. For example, if the quantization parameter may range in value from 0 to 51 (i.e., 52 possible values), then if the quantization parameter is less then a first quantization threshold then the adjusting of the intra prediction error values may be by a first specified value. While if the quantization parameter is greater than the first quantization threshold, then the adjusting of the intra prediction error values may be by a second specified value. As with the adjusting of the intra prediction error values based on the MB activity value, additional thresholds may be used to provide greater control in the tuning of the intra prediction error values.

If the MB activity value is greater than the first threshold but less than a second threshold (block 530), then the intra prediction error values may be adjusted by a second factor (block 535). The second threshold may be specified to denote what may be defined as a relatively smooth MB, so if the MB activity value is less than the second threshold, then the MB is relatively smooth. If the MB is relatively smooth, then the adjusted intra prediction error values may provide reasonably accurate results, therefore, moderate emphasis should be given to the intra prediction error values. This may be achieved by adjusting (scaling) the intra prediction error value moderately (or by scaling the intra prediction error values by a large amount).

If the MB activity value is greater than the second threshold (block 530), then the MB is relatively unsmooth and the adjusted intra prediction error values may not be capable of providing accurate results. Therefore, it may be desirable not to use the intra prediction error values at all in the video coding. For example, this may be achieved by setting the intra prediction error value to a null value (or zero) (block 540). If the intra prediction error value is not used, then the video coding of image data 500 may revert to the prior art technique of using only neighboring pixel's original values in video coding.

As an example, let the adjustment to the intra prediction error values E be defined as:

$$f(E) = \frac{E}{d},$$

where d is an scaling value. Furthermore, if the MB activity value is less than the first threshold, then the MB is classified as a Class 1 MB. If the MB activity value is greater than the first threshold but less than the second threshold, then the MB is classified as a Class 2 MB. If the MB activity value is greater than the second threshold, then the MB is classified as a Class 3 MB. Additionally, let the quantization parameter range from 0 to 51, set the first threshold at 512, the second threshold at 1024, the first quantization threshold at 30, and the second quantization threshold at 32 or 34.

Then, if an MB activity value is less than 512, the MB is classified as a Class 1 MB and if the quantization parameter is greater than the first quantization threshold, then d is set to one (1) while if the quantization parameter is smaller than the first quantization threshold, then setting the intra prediction error value to zero. If the MB is classified as a Class 2 MB (MB activity value less than 1024 but greater than 512), and if the quantization parameter is in a range [the first quantization threshold, the second quantization threshold] then d is set to four (4), while if the quantization parameter is greater than the second quantization threshold then d is set to two (2).

After the intra prediction error values E has been adjusted, then they may be saved for use in coding adjacent MBs (or blocks) (block 542). After saving the adjusted intra prediction error values, adjusted intra prediction error values of neighboring MBs (or blocks) may be used in the video coding of the MB (blocks of the MB) (block 545). The video coding of image data may continue as long as additional image data continue to be received. If additional image data is not received, then the video coding of image data may terminate.

Figure 6A:
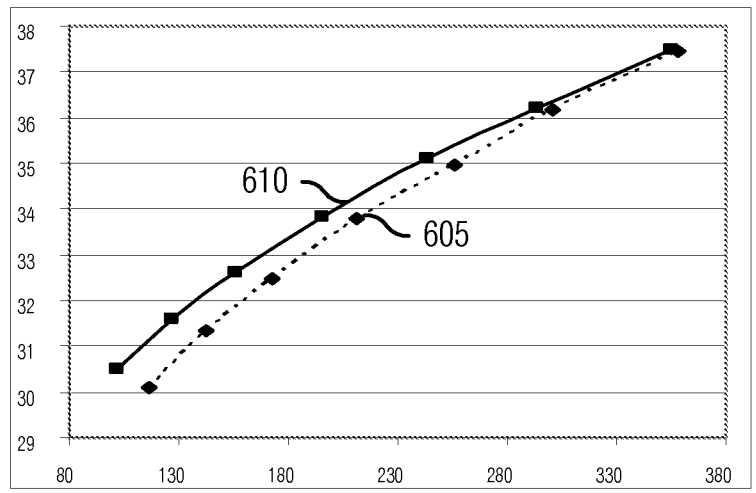
FIGS. 6a and 6b are data plots of performance simulations.

FIG. 6a is a data plot illustrating peak-signal-to-noise ratio (PSNR) to bit-rate for a first exemplary video sequence. A first trace 605 represents the performance of a video coder using the prior art technique of using neighboring pixel's original values and a second trace 610 represents the performance of a video coder using the multi-level video coding with prediction error feedback. As shown in FIG. 6a, the use of multi-level video coding with prediction error feedback yields a higher PSNR over an entirety of bit-rates.

Figure 6B:
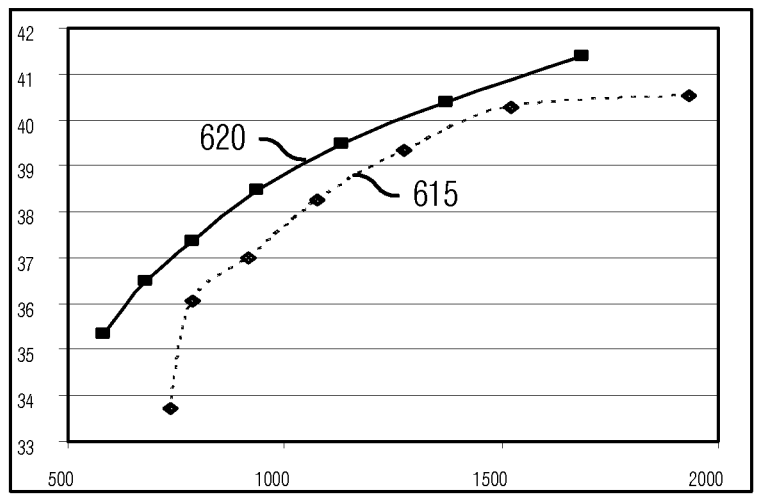

FIG. 6b is a data plot illustrating PSNR to bit-rate for a second exemplary video sequence. A third trace 615 represents the performance of a video coder using the prior art technique of using neighboring pixel's original values and a fourth trace 620 represents the performance of a video coder using the multi-level video coding with prediction error feedback. As shown in FIG. 6b, the use of multi-level video coding with prediction error feedback yields a higher PSNR over an entirety of bit-rates.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of a video coder processor for computing intra prediction error feedback values, the method comprising:
   receiving via the video coder processor the image data, wherein the image data contains at least one macro block of pixels;
   computing an activity indicator for a macro block;
   computing prediction error values for pixels in the macro block, wherein computing the prediction error values comprises, for each pixel in the macro block computing a difference between a value of the pixel and an estimated reconstructed pixel value of its neighboring pixel wherein the estimated reconstructed pixel value of a current pixel is expressible as estimated reconstructed pixel value=A−f(A−a'), where A is the original pixel value of the current pixel, a' is the estimated reconstructed pixel value of the current pixel's neighboring pixel, and f(A−a') is a scaling function an intra-prediction error; and
   scaling the prediction error values based on the activity indicator to produce intra prediction error feedback values; and
   estimating the reconstructed pixel values for pixels in the macroblock from the original pixel values and the scaled prediction error values.

2. The method of claim 1, further comprising:
   receiving a second macro block of pixels; and
   repeating the computing an activity indicator, the computing prediction error values the prediction errors, and estimating the reconstructed pixel values the scaling for the second macro block.

3. The method of claim 2, wherein computing the activity indicator comprises computing a difference between each pair of pixels in the macro block.

4. The method of claim 2, wherein computing the difference comprises computing a sum of an absolute value of a difference between each pair of pixels.

5. The method of claim 1, wherein a pixel's neighboring pixel is a pixel in a third macro block immediately adjacent to the macro block, and wherein a pixel's neighboring pixel is dependant on a video coding mode.

6. The method of claim 1, wherein scaling the prediction error values comprises dividing the prediction error values with a scaling value proportional to the activity indicator.

7. The method of claim 6, wherein the scaling value is further based on a measure of quantization being performed on the macro block.

8. A method of a video coder processor for video coding in data, the method comprising:
   receiving via the digital processor the image data, wherein the image dal comprises at least one block of pixels;
   computing an activity indicator for the block, wherein the activity indicator comprises an absolute value of pixel differences expressible as:

$$\text{Activity} = \sum_{y=1}^{Y} \sum_{x=2}^{X} |MB(y, x) - MB(y, x-1)|,$$

where MB(y,x) is the original value of pixel (y,x) in the block, Y is a number of pixels in a first dimension of the block, and X is a number of pixels in a second dimension of the block;
   computing prediction error values for each pixel in the block; adjusting the prediction error values by a factor based on the activity indicator;
   estimating the reconstructed pixel values for each pixel from the original pixel values and the scaled prediction error values; and
   video coding the block using the estimated video decoding values of a neighboring block.

9. The method of claim 8, further comprising after the estimating the reconstructed pixel values, saving the estimated reconstructed pixel values.

10. The method of claim 9, further comprising repeating computing the activity indicator, computing the prediction error value, adjusting the prediction error, estimating the reconstructed pixel value, saving the estimated reconstructed pixel values, and video coding for a second block of pixels.

11. The method of claim 8, wherein computing the activity indicator comprises computing a difference of pixel values in the block.

12. The method of claim 11, wherein the difference comprises an absolute value of horizontal pixel difference, an absolute sum of vertical pixel difference, an absolute sum of horizontal and vertical differences, a weighted sum of horizontal and/or vertical pixel differences, a squares of horizontal and/or vertical pixel differences, or transformed coefficient differences.

13. The method of claim 8, wherein adjusting the prediction error values comprises:
- adjusting the prediction error values by a first factor in response to determining that the activity indicator is less than a first threshold;
- adjusting the prediction error values by a second factor in response to determining that the activity indicator is greater than the first threshold but less than a second threshold; and
- adjusting the prediction error values by a third factor in response to determining that the activity indicator is greater than the second threshold.

14. The method of claim 13, wherein the adjusting by the first factor places a greater emphasis on the prediction error values than the adjusting by the second factor, and wherein the adjusting by the third factor substantially zeroes out a contribution of the prediction error values in the video coding.

15. The method of claim 8, wherein the adjusting further comprises adjusting the prediction error values based on a degree of quantization performed in the video coding.

16. The method of claim 15, wherein the adjusting the prediction error values based on a degree of quantization increases a contribution of the prediction error values in the video coding in response to determining that the degree of quantization is less than a third threshold.

* * * * *